(12) United States Patent
Sundberg (10) Patent No.: US 9,975,190 B2
(45) Date of Patent: May 22, 2018

(54) TRANSMISSION BELT ADJUSTMENT FOR A POWER CUTTER

(71) Applicant: HUSQVARNA AB, Huskvarna (SE)

(72) Inventor: Niklas Sundberg, Alingsås (SE)

(73) Assignee: HUSQVARNA AB, Huskvarna (SE)

( * ) Notice: Subject to any disclaimer, the term of this patent is extended or adjusted under 35 U.S.C. 154(b) by 0 days. days.

(21) Appl. No.: 15/533,257

(22) PCT Filed: Dec. 22, 2014

(86) PCT No.: PCT/SE2014/051560
§ 371 (c)(1),
(2) Date: Jun. 5, 2017

(87) PCT Pub. No.: WO2016/105255
PCT Pub. Date: Jun. 30, 2016

(65) Prior Publication Data
US 2017/0334005 A1    Nov. 23, 2017

(51) Int. Cl.
*B23D 45/16* (2006.01)
*B23D 47/00* (2006.01)
(Continued)

(52) U.S. Cl.
CPC ............. *B23D 47/12* (2013.01); *B23D 45/16* (2013.01); *B27B 5/29* (2013.01); *B28D 1/04* (2013.01)

(58) Field of Classification Search
CPC .......... B23D 45/16; B23D 47/12; B27B 5/29; B28D 1/04
See application file for complete search history.

(56) References Cited

U.S. PATENT DOCUMENTS

| 3,194,284 A | 7/1965 | Walker |
| 4,848,001 A | 7/1989 | Clark et al. |

(Continued)

FOREIGN PATENT DOCUMENTS

AT    369689    1/1983

OTHER PUBLICATIONS

International Preliminary Report on Patentability for International Application No. PCT/SE2014/051560 dated Jun. 27, 2017.
(Continued)

*Primary Examiner* — Stephen Choi
(74) *Attorney, Agent, or Firm* — McNair Law Firm, P.A.

(57) ABSTRACT

The present invention relates to a portable power tool (1) arranged for driving a rotatable cutting tool (2). The power tool (1) comprises a motor (5) and a transmission part (4) that is arranged to transfer power from the motor (5) to a tool holder (10), and comprises a first arm part (11; 11') and a second arm part (12; 12'). The first arm part (11; 11') comprises a first belt pulley (13) and the second arm part comprises a second belt pulley (14), the arm parts (11, 12; 11', 12') being slidably connected to each other. The belt pulleys (13, 14) are spaced apart by a certain distance (d-i, d2). The transmission part (4) further comprises a tensioning device (20) with a rod (21), a pre-tensioned resilient device (22), a linkage arrangement (25) and a rotatable part (26). The rotatable part (26) is rotatable between a first, released, state where the belt pulleys (13, 14) are spaced apart by a first distance (d-i), and a second, tightened, state where the belt pulleys (13,14) are spaced apart by a second distance (d2) that exceeds the first distance (d-i), the resilient device (22) being more compressed in the second state than in the first state.

17 Claims, 5 Drawing Sheets

(51) Int. Cl.
  *B23D 59/00* (2006.01)
  *B23D 47/12* (2006.01)
  *B27B 5/29* (2006.01)
  *B28D 1/04* (2006.01)

(56) References Cited

U.S. PATENT DOCUMENTS

| | | | | |
|---|---|---|---|---|
| 4,977,708 | A | * | 12/1990 | Kloft ..................... B23D 47/12 451/311 |
| 5,528,835 | A | | 6/1996 | Ra |
| 7,390,276 | B2 | | 6/2008 | Tryphonos |
| 7,823,653 | B2 | | 11/2010 | Meixner et al. |
| 8,668,027 | B2 | | 3/2014 | Hoffmann et al. |
| 2004/0033852 | A1 | * | 2/2004 | Taomo .................. B23D 47/12 474/101 |
| 2009/0007435 | A1 | | 1/2009 | Droste |
| 2009/0082145 | A1 | * | 3/2009 | Meixner ............... B23D 45/16 474/109 |
| 2015/0360339 | A1 | * | 12/2015 | Suzuki .................. B24B 21/20 451/355 |

OTHER PUBLICATIONS

International Search Report and Written Opinion for International Application No. PCT/SE2014/051560 dated Sep. 15, 2015.

* cited by examiner

TRANSMISSION BELT ADJUSTMENT FOR A POWER CUTTER

TECHNICAL FIELD

The present disclosure relates to a portable power tool arranged for driving a rotatable cutting tool, where the power tool comprises a motor part and a transmission part. The motor part comprises a motor and a motor housing, and the transmission part is arranged to transfer power from the motor to a tool shaft and a tool holder that is arranged to hold the cutting tool. The transmission part comprises a first arm part and a second arm part, where the first arm part comprises a first belt pulley and where the second arm part comprises a second belt pulley. The arm parts are slidably connected to each other along a longitudinal extension, and the belt pulleys are spaced apart by a certain distance along the longitudinal extension. The transmission part further comprises a tensioning device.

BACKGROUND

In the case of a portable power tool such as a cut-off saw, belt transmission arrangements have been widely employed as power transmission device for transmitting the power of a driving motor such as an internal combustion engine, hydraulic engine or electric motor, to a rotatable working member such as a rotating cutter. A belt disposed between and wound around a pair of transmission wheels, where a first transmission wheel is connected to the driving motor and a second transmission wheel is connected to the rotatable working member.

Such a belt is relatively stiff, and has to be kept under a predetermined tension in order to minimize transmission and power losses. It is also desired to be able to relatively easily change the belt when it has been worn out or has been broken.

It is previously known to have the transmission wheels mounted to an arm that comprises two components longitudinally movable relative each other, i.e. in the longitudinal direction of the belt, in a co-axial manner. Previously, screw tension devices have been proposed for displacing the two components, see for example US 2009007435. Such screw tension devices may be troublesome and time-consuming to handle, there may be a number of bolts that have to be loosened as well.

It is therefore desirable to provide a secure transmission belt adjustment device that is easily used and ensures a proper belt tension.

SUMMARY

It is an object of the present invention to provide a secure transmission belt adjustment device that is easily used and ensures a proper belt tension.

Said object is obtained by means of a portable power tool arranged for driving a rotatable cutting tool, where the power tool comprises a motor part and a transmission part. The motor part comprises a motor and a motor housing, and the transmission part is arranged to transfer power from the motor to a tool shaft and a tool holder that is arranged to hold the cutting tool. The transmission part comprises a first arm part and a second arm part, where the first arm part comprises a first belt pulley and where the second arm part comprises a second belt pulley. The arm parts are slidably connected to each other along a longitudinal extension, and the belt pulleys are spaced apart by a certain distance along the longitudinal extension. The transmission part further comprises a tensioning device, which in turn comprises a rod, at least one resilient device that is pre-tensioned between a first spring holder and a second spring holder, a linkage arrangement and a rotatable part that is rotatable around a pivot axis. The rotatable part is connected to the resilient device via the linkage arrangement and the first spring holder, and the resilient device is connected to the rod via the second spring holder. The rod is slidably connectable to the second arm part, and the rotatable part is rotatable between a first, released, state where the belt pulleys are spaced apart by a first distance and a second, tightened, state where the rod is arranged to engage the second arm part such that the belt pulleys are spaced apart by a second distance. The second distance exceeds the first distance, and the resilient device is more compressed in the second state than in the first state.

According to an example, the rotatable part is arranged to compress the resilient device further between the spring holders via the linkage arrangement when it is rotated a first angular distance in a certain direction from the first state to an equilibrium point. The rotatable part is further arranged to release the resilient device via the linkage arrangement when it is further rotated a second angular distance in the same direction, from the equilibrium point to the second state, the first angular distance exceeding the second angular distance.

According to another example, the resilient device is a helical spring, a rubber spring or a cup spring.

According to another example, the pivot axis is perpendicular to the longitudinal extension.

According to another example, the tensioning device comprises a first stop surface and a second stop surface, where the first stop surface is arranged to abut the second stop surface in the second state.

According to another example, the tensioning device comprises a connecting rod that connects the first spring holder with the second spring holder such that the resilient device is pre-tensioned but allows the resilient device to be further compressible between the first spring holder and the second spring holder.

According to another example, the tensioning device comprises a pivot rod around which the rotatable part is arranged to pivot.

According to another example, the linkage arrangement comprises a first link arm part that is fixed to the rotatable part and a second link arm part that is fixed to the first spring holder. The link arm parts are pivotably connected to each other by means of a pivot pin that runs through the link arms a certain distance from the pivot axis.

According to another example, the rod is connected to the resilient device via the second spring holder, where the resilient device is compressible between the first spring holder and the second spring holder.

According to another example, the first arm part comprises at least one slot extending along the longitudinal extension, and that for each slot the second arm part comprises a corresponding sliding pin, each of said at least one sliding pin being slidably arranged in a corresponding slot.

According to another example, the first belt pulley is connected to the motor and the second belt pulley is connected to the tool shaft. Alternatively, the first belt pulley is connected to the tool shaft and the second belt pulley is connected to the motor.

A number of advantages are provided by means of the present invention, for example:

Easily understood with distinct and easily recognizable states.

A secure switching to the second state since the resilient device is further compressed compared to the first state.

Less sensitive to tolerances and accumulated dirt.

Low friction.

Reduced risk for over- and/or under-tensioning.

Easy to assemble and disassemble.

BRIEF DESCRIPTION OF THE DRAWINGS

The present invention will now be described more in detail with reference to the appended drawings, where.

DETAILED DESCRIPTION

Figure 1:
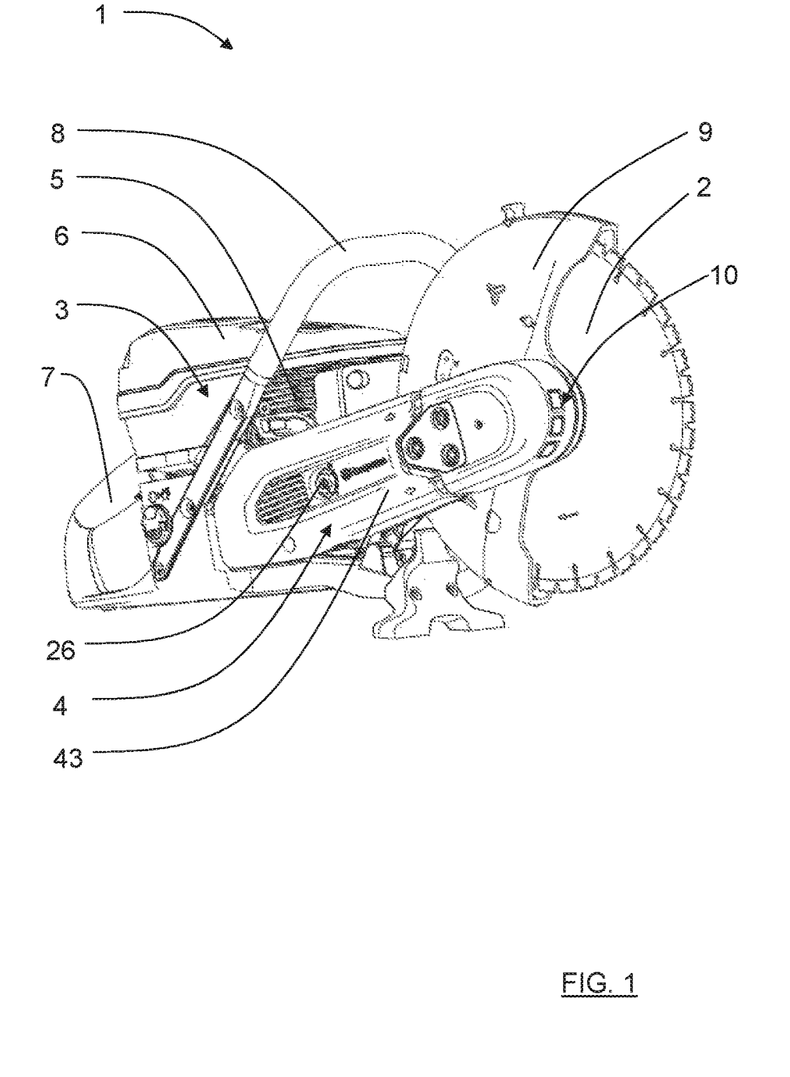
FIG. 1 shows a perspective side view of a power cutter.
Figure 2:
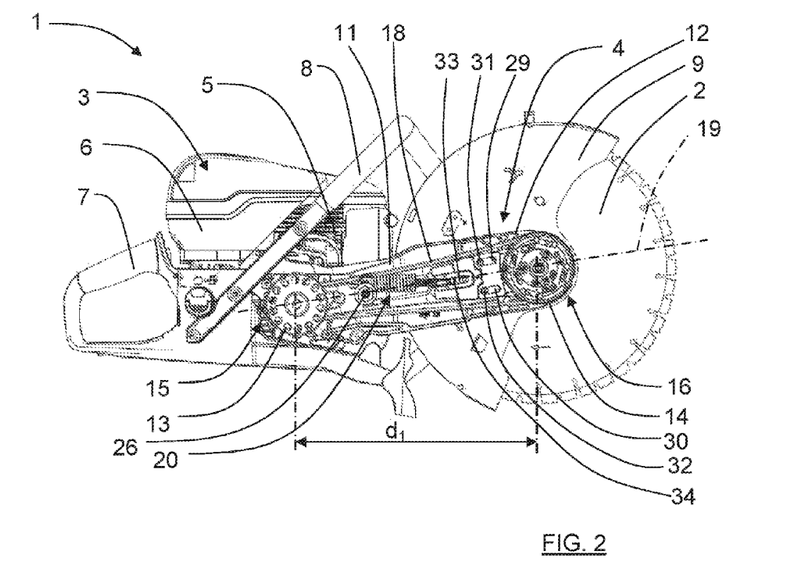
FIG. 2 shows a side view of a power cutter without protective transmission cover in a first state.
Figure 3:
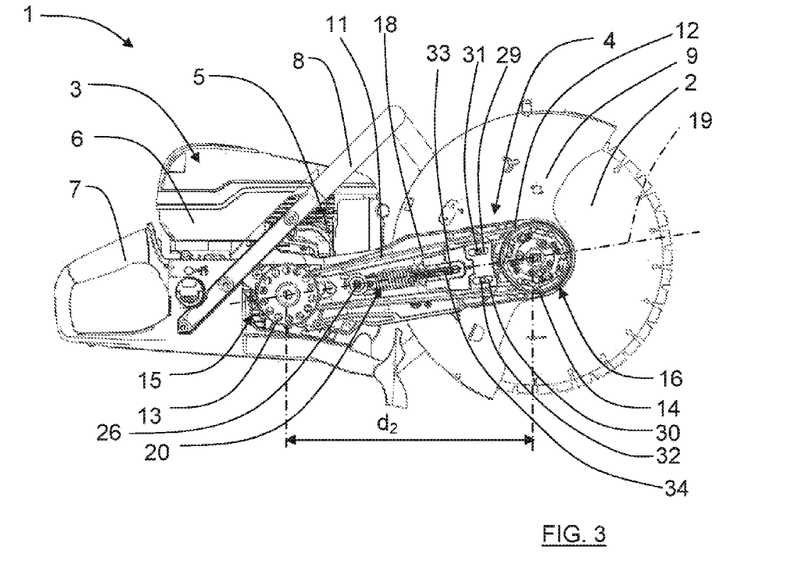
FIG. 3 shows a side view of a power cutter without protective transmission cover in a second state.
Figure 4:
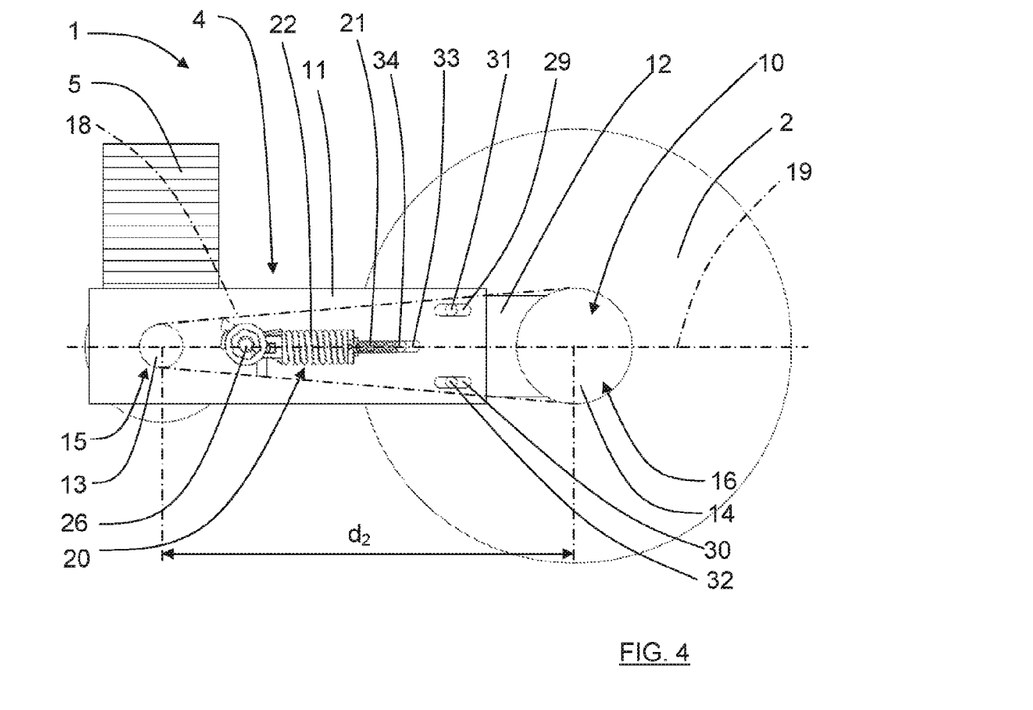
FIG. 4 shows a schematic side view of a power cutter without motor housing and protective transmission cover.
Figure 5:
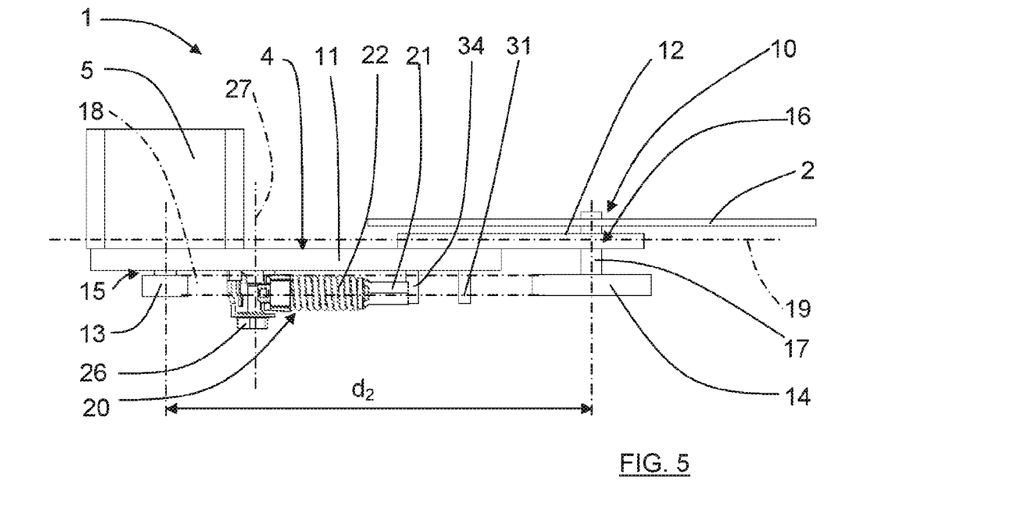
FIG. 5 shows a schematic top view of a power cutter without motor housing and protective transmission cover.

A first example will now be described with reference to FIG. 1, FIG. 2, FIG. 3, FIG. 4 and FIG. 5. FIG. 1 shows a perspective side view of a power cutter, FIG. 2 shows a side view of a power cutter without protective transmission cover in a first state and FIG. 3 shows a side view of a power cutter without protective transmission cover in a second state. FIG. 4 shows a schematic side view of a power cutter without motor housing and protective transmission cover, and FIG. 5 shows a corresponding top view.

A portable power tool 1, here in the form of a power cutter 1, is arranged for driving a rotatable cutting tool 2, here in the form of a circular concrete saw blade 2. A saw blade protective cover 9 is arranged to cover a part of the saw blade 2.

The power cutter 1 comprises a motor part 3 and a transmission part 4, the motor part 3 comprising a motor 5 and a motor housing 6. A first handle 7 and a second handle 8 are attached to the motor housing, where the first handle is positioned at the rear end of the power cutter 1 and the second handle is in the form of a loop handle. A protective transmission cover 43 is positioned over the transmission part 4 as shown in FIG. 1.

Figure 9:
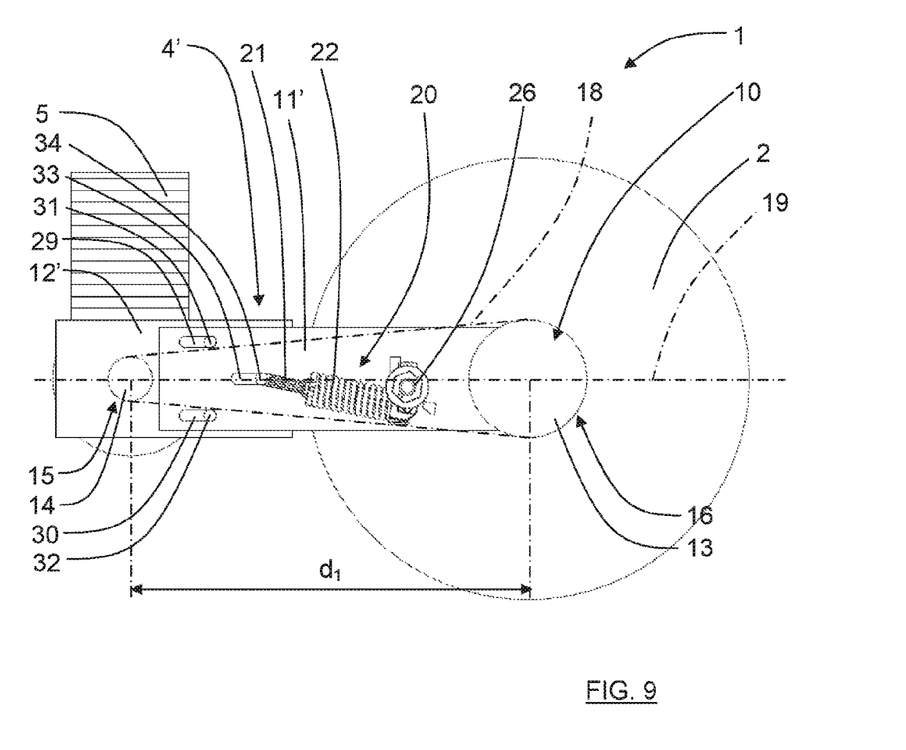
FIG. 9 shows a schematic side view of a power cutter without motor housing and protective transmission cover according to a second example in a first, released, state.

The transmission part 4 is arranged to transfer power from the motor 5 to a tool holder 10 that is arranged for holding the saw blade 2, the transmission part 4 comprising a first arm part 11 and a second arm part 12. The first arm part 11 comprises a first belt pulley 13 and the second arm part 12 comprises a second belt pulley 14. The first belt pulley 13 is comprised in a crank case assembly 15 that is connected to the motor 5, and the second belt pulley 14 is comprised in a bearing house 16. The bearing house 16 also comprises a tool shaft 17 that is connected to the second belt pulley 14, as is evident from FIG. 5. This means that in this embodiment, the first belt pulley 13 is connected to the motor 5 and the second belt pulley 14 is connected to the tool shaft 17. The first belt pulley 13 and the second belt pulley 14 are arranged for driving and being driven by an endless transmission belt 18 (only indicated with dash-dotted lines in FIG. 4, FIG. 5 and FIG. 9).

The arm parts 11, 12 are slidably connected to each other along a longitudinal extension 19, such that the belt pulleys 13, 14 are spaced apart by a certain adjustable distance $d_1$, $d_2$ along the longitudinal extension 19, as depicted in FIG. 2 and FIG. 3. For this reason, the first arm part 11 comprises a first slot 29 and a second slot 30, the slots 29, 30 extending along the longitudinal extension 19 The second arm part 12 comprises a first sliding pin 31 slidably arranged in the first slot 29, and a second sliding pin 32 slidably arranged in the second slot 30.

The transmission part 4 further comprises a tensioning device 20 that is attached to the first arm part 11, where FIG. 2 shows the tensioning device 20 in a first, released, state, and where FIG. 3, FIG. 4 and FIG. 5 shows the tensioning device 20 in a second, tightened, state.

Figure 6:
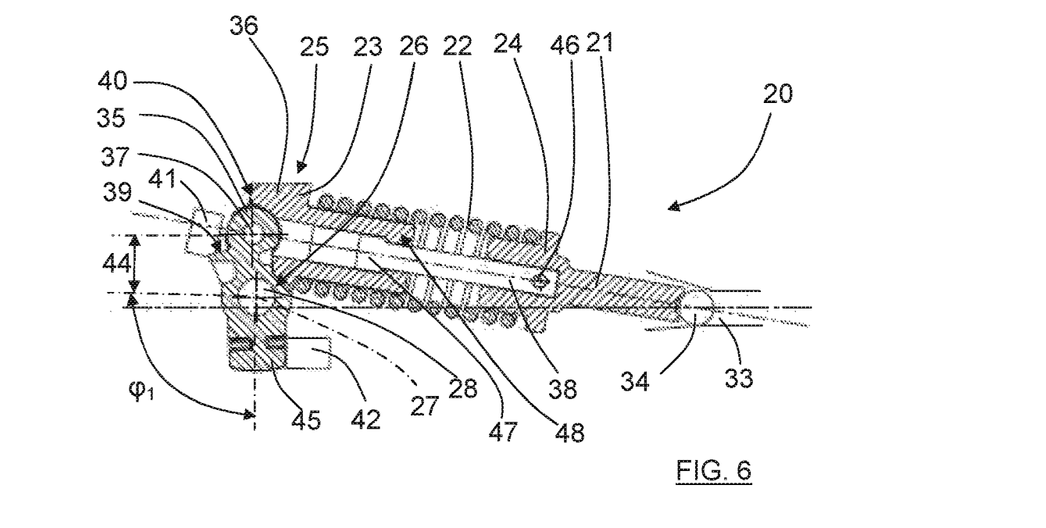
FIG. 6 shows a detailed section side view of a tensioning device in a first, released, state.
Figure 7:
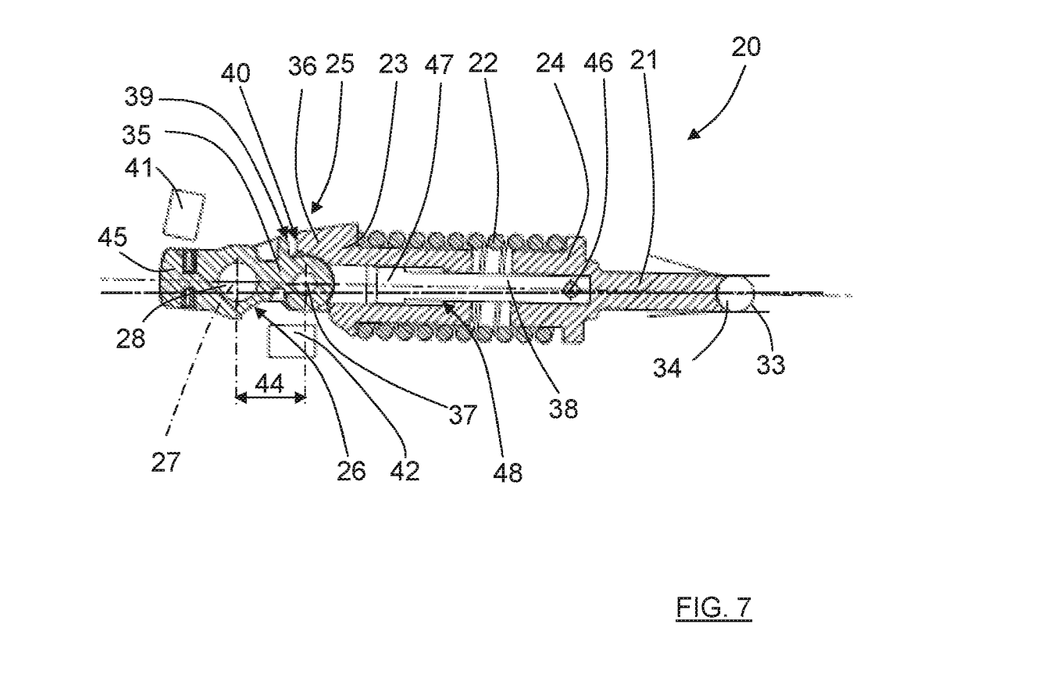
FIG. 7 shows a detailed section side view of the tensioning device in an equilibrium state.
Figure 8:
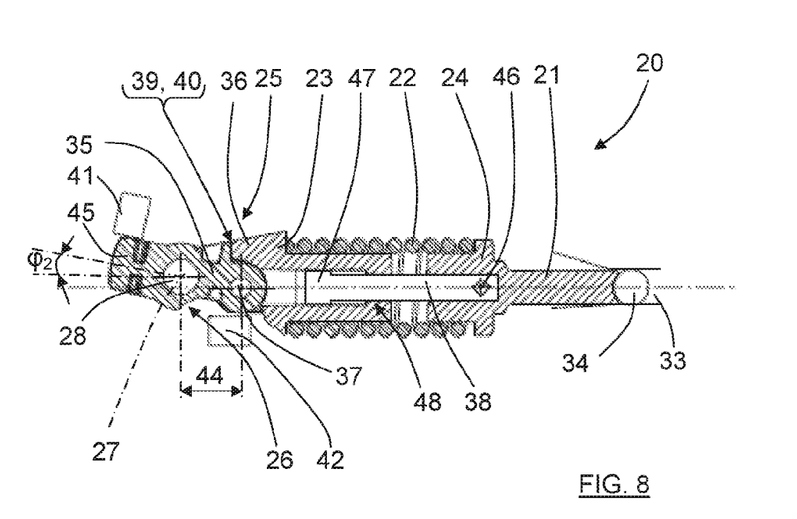
FIG. 8 shows a detailed section side view of the tensioning device in a second, tightened, state.

With reference also to FIG. 6, FIG. 7, and FIG. 8, FIG. 6 showing a detailed section side view of the tensioning device 20 in the first, released, state, FIG. 7 showing a detailed section side view of the tensioning device 20 in an equilibrium state and FIG. 8 showing a detailed section side view of the tensioning device 20 in the second, tightened, state, the tensioning device 20 will be described more in detail.

According to the present invention, the tensioning device 20 comprises a rod 21, a helical spring 22 that is pre-tensioned between a first spring holder 23 and a second spring holder 24, a linkage arrangement 25 and a rotatable part 26 that is rotatable around a pivot axis 27 that is perpendicular to the longitudinal extension 19. The tensioning device comprises a pivot rod 28 around which the rotatable part 26 is arranged to pivot. The pivot rod 28 is for example mounted to the first arm part 11 by means of screwing or press-fit, or may alternatively be formed integrally with the first arm part 11.

The rotatable part 26 is connected to the helical spring 22 via the linkage arrangement 25 and the first spring holder 23, and the helical spring 22 is connected to the rod 21 via the second spring holder 24. The rod 21 is slidably connectable to the second arm part 12, and the rotatable part 26 is rotatable between the first, released, state where the belt pulleys 13, 14 are spaced apart by a first distance $d_1$, and a second tightened, state where the belt pulleys 13, 14 are spaced apart by the second distance $d_2$, where the second distance $d_2$ exceeds the first distance $d_1$. By rotating the rotatable part 26 from the first, released, state, the second, tightened, state, the first arm part 11 and the second arm part 12 are moved way from each other along the longitudinal extension 19 by means of the rod 21 engaging the second arm part 12, and the helical spring becomes more compressed in the second state than in the first state.

The helical spring 22 is pre-tensioned by means of a connecting rod 38 that connects the first spring holder 23 with the second spring holder 24. The connecting rod 38 is mounted in such a way that it maintains a maximum distance between the first spring holder 23 and the second spring holder 24, but allows this maximum distance to be decreased, the helical spring 22 being compressible between the first spring holder 23 and the second spring holder 24. As shown in FIG. 6, FIG. 7 and FIG. 8, the connecting rod 38 is attached to the second spring holder 24 by means of a holding pin 46, but is allowed to have a limited movement within the first spring holder 23, the movement that strives to un-compress the helical spring 22 being limited by a flange 47 on the connecting rod 28, which flange 47 is arranged to co-operate with a flange seat 48 on the first spring holder 23.

Preferably, the rotatable part 26 is arranged to compress the pre-tensioned helical spring 22 further between the spring holders 23, 24 via the linkage arrangement 25 when it is rotated a first angular distance $\varphi_1$ from the first state (as shown in FIG. 6) to an equilibrium point (as shown in FIG. 7), and where the rotatable part 26 is arranged to release the helical spring 22 via the linkage arrangement 25 when it is rotated further a second angular distance $\varphi_2$ from the equilibrium point to the second state (as shown in FIG. 8), the first angular distance $\varphi_1$ exceeding the second angular distance $\varphi_2$.

In order to enable the rod's slidable connection to the second arm part 12, the first arm part 11 comprises a third slot 33 extending along the longitudinal extension 19. The second arm part 12 comprises a third sliding pin 34 slidably arranged in the third slot 33, where the rod 21 is arranged to engage the third sliding pin 34 and in the second state press the third sliding pin 34 away from the tensioning device 20 such that the distance between the belt pulleys 13, 14 is increased to the second distance $d_2$. The third slot 33 is at least partly v-shaped, the wider part of the third slot 33 facing the rod 22, allowing the rod 21 to partly move along an extension that is perpendicular to the longitudinal extension 19 when the rod 21 at least partly is within the third slot 33. This is suitable, since the rod 21 does not move exactly along the extension of the third slot 33 during the transit from the first state to the second state as is evident from FIG. 6, FIG. 7 and FIG. 8.

The linkage arrangement 25 comprises a first link arm 35 that is fixed to the rotatable part 26 and a second link arm 36 that is fixed to the first spring holder, where the link arms 35, 36 are pivotably connected to each other by means of a pivot pin 37 that runs through the link arms 35, 36 a certain offset distance 44 from the pivot axis 27. In this example, the first link arm 35 is formed integrally with the rotatable part 26, the second link arm 36 is formed integrally with the first spring holder 23, and the rod 21 is formed integrally with the second spring holder 24. However, these parts may be formed separately.

The first link arm 35 comprises a first stop surface 39 and the second link arm 36 comprises a second stop surface 40. In the first state, these stop surfaces 39, 40 are spaced apart, and in the second state, these stop surfaces 39, 40 are arranged to abut each other, preventing further motion and thus defining the second angular distance $\varphi_2$.

In order to provide further security, a first stop part 41 and a second stop part 42 are formed in the first arm part 11 and are arranged to engage opposing sides of a protrusion 45 formed in the rotatable part 26, as evident from FIG. 6 and FIG. 8.

The present invention is not limited to the examples above, but may vary freely within the scope of the appended claims. For example, with reference to FIG. 9 that shows a second example, there is an alternative transmission part 4' comprising a first arm part 11' and a second arm part 12'. The first arm part 11' comprises a first belt pulley 13' and the second arm part 12' comprises a second belt pulley 14'. The arm parts 11', 12' are here positioned reversely, such that the second belt pulley 14' is comprised in the crank case assembly 15 that is connected to the motor 5, and the first belt pulley 13' is comprised in the bearing house 16 and connected to the tool shaft 17. This means that the tensioning device 20 is mounted on the same arm part as the bearing house 16 with the tool shaft 17, and that the first belt pulley 13' is connected to the motor 5 and the second belt pulley 14' is connected to the tool shaft 17.

There is at least one slot with a corresponding sliding pin. For the example described above, the third slot 33 and the third sliding pin 34 should be present since these are necessary. However, this is not necessary; the rod may engage other components than the third sliding pin 34. The rod should engage one component comprised in the second arm part 12 such that the first arm part 11 and the second arm part 12 are moved way from each other along the longitudinal extension 19.

Preferably, the sliding pins have a threaded ends, where corresponding locking nuts may be mounted to lock the distance between the first belt pulley 13 and the second belt pulley 14.

The helical spring 22 has been described as being pre-tensioned by means of a connecting rod 38, but other arrangements for pre-tensioning are of course conceivable. For example, the helical spring 22 may be enclosed in a cylindrical housing that limits its expansion, keeping it pre-tensioned. An example of a typical pre-tension is 50 kg. Many other values are of course conveyable while maintaining the functionality of the present invention.

The helical spring 22 can be constituted by any suitable type of resilient device 22, for example a rubber spring or a cup spring.

The linkage arrangement 25 may comprise fewer or more link parts, and may have different constitutions. The rotation direction of the rotatable part 26 in order to change between the first state and the second state may of course vary depending on how the tensioning device 20 is oriented.

There does not have to be a pivot rod 28, other arrangements are conceivable for obtaining a pivot axis 27 around which the rotatable part 26 may rotate. For example, there may be an outer circular partial frame in the first arm part 11 that holds the rotatable part 26.

The first stop part 41 and/or the second stop part 42 need not be present, such that only at least one of the stop surfaces 39, 40 is used. Alternatively, the stop surfaces 39, 40 are not present, and the first stop part 41 and/or the second stop part 42 are then used as alternatives to the stop surfaces 39, 40.

The pivot axis 27 has been described to be perpendicular to the longitudinal extension 19, but this is not necessary. The pivot axis 27 may have other extensions with maintained functionality.

The link arms 35, 36 are generally constituted by link arm parts 35, 36.

The invention claimed is:

1. A portable power tool arranged for driving a rotatable cutting tool, wherein the power tool comprises a motor part and a transmission part, the motor part comprising a motor and a motor housing, the transmission part being arranged to transfer power from the motor to a tool shaft and a tool holder that is arranged to hold the cutting tool, the transmission part comprising a first arm part and a second arm part, the first arm part comprising a first belt pulley and the second arm part comprising a second belt pulley, the first and second arm parts being slidably connected to each other along a longitudinal extension, the belt pulleys being spaced apart by a certain distance along the longitudinal extension, wherein the transmission part further comprises a tensioning device, wherein the tensioning device comprises a rod, at least one resilient device that is pre-tensioned between a first spring holder and a second spring holder, a linkage arrangement and a rotatable part that is rotatable around a pivot axis, wherein the rotatable part is connected to the resilient device via the linkage arrangement and the first spring holder, and the resilient device is connected to the rod via the second spring holder, wherein the rod is slidably connectable to the second arm part, and wherein the rotatable part is rotatable between a first, released, state where the belt pulleys are spaced apart by a first distance, and a second, tightened, state where the rod is arranged to engage the second arm part such that the belt pulleys are spaced apart by a second distance that exceeds the first distance, the resilient device being more compressed in the second state than in the first state.

2. A portable power tool according to claim 1, wherein the rotatable part is arranged to compress the resilient device further between the spring holders via the linkage arrangement when being rotated a first angular distance in a certain direction from the first state to an equilibrium point, and wherein the rotatable part is arranged to release the resilient device via the linkage arrangement when being further rotated a second angular distance in the same direction, from the equilibrium point to the second state, the first angular distance exceeding the second angular distance.

3. A portable power tool according to claim 1, wherein said resilient device is a helical spring, a rubber spring or a cup spring.

4. A portable power tool according to claim 1, wherein the pivot axis is perpendicular to the longitudinal extension.

5. A portable power tool according to claim 1, wherein the tensioning device comprises a first stop surface and a second stop surface, wherein the first stop surface is arranged to abut the second stop surface in the second state.

6. A portable power tool according to claim 1, wherein the tensioning device comprises a first stop part and a second stop part are formed in the first arm part and are arranged to engage opposing sides of a protrusion formed in the rotatable part.

7. A portable power tool according to claim 1, wherein the tensioning device comprises a connecting rod that connects the first spring holder with the second spring holder such that the resilient device is pre-tensioned but allows the resilient device to be further compressible between the first spring holder and the second spring holder.

8. A portable power tool according to claim 1, wherein the tensioning device comprises a pivot rod around which the rotatable part is arranged to pivot.

9. A portable power tool according to claim 8, wherein the pivot rod is mounted to the first arm part by screwing or press-fit, or is formed as an integrated part of the arm part.

10. A portable power tool according to claim 1, wherein the linkage arrangement comprises a first link arm part that is fixed to the rotatable part and a second link arm part that is fixed to the first spring holder, wherein the link arm parts are pivotably connected to each other by means of a pivot pin that runs through the link arms a certain distance from the pivot axis.

11. A portable power tool according to claim 1, wherein the rod is connected to the resilient device via the second spring holder, wherein the resilient device is compressible between the first spring holder and the second spring holder.

12. A portable power tool according to claim 1, wherein the first arm part comprises at least one slot extending along the longitudinal extension, and that for each slot of the at least one slot, the second arm part comprises a corresponding sliding pin, each corresponding sliding pin being slidably arranged in a corresponding slot.

13. A portable power tool according to claim 12, wherein the rod is arranged to engage the second arm part via one of the sliding pins that is slidably arranged in a corresponding slot.

14. A portable power tool according to claim 13, wherein the third slot at least partly is v-shaped, the wider part facing the rod, allowing the rod to partly move along an extension that is perpendicular to the longitudinal extension when the rod at least partly is within the third slot.

15. A portable power tool according to claim 1, wherein the first belt pulley is connected to the motor and that the second belt pulley is connected to the tool shaft.

16. A portable power tool according to claim 1, wherein the first belt pulley is connected to the tool shaft and that the second belt pulley is connected to the motor.

17. A portable power tool according to claim 1, wherein the first belt pulley and the second belt pulley are arranged for driving or being driven by an endless transmission belt.

\* \* \* \* \*